(12) United States Patent　　　(10) Patent No.:　　US 9,111,582 B2
　　Eseanu et al.　　　　　　　　　　(45) Date of Patent:　　　Aug. 18, 2015

(54) METHODS AND SYSTEMS FOR PREVIEWING CONTENT WITH A DYNAMIC TAG CLOUD

(75) Inventors: Costin-Ioan Eseanu, Bucharest (RO); Blanariu Gheorghe, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 489 days.

(21) Appl. No.: 12/534,313

(22) Filed: Aug. 3, 2009

(65) Prior Publication Data

US 2011/0029873 A1　　Feb. 3, 2011

(51) Int. Cl.
　　*G06F 17/30*　　　(2006.01)
　　*G06F 3/0484*　　(2013.01)
　　*G11B 27/34*　　　(2006.01)
　　*G11B 27/10*　　　(2006.01)
　　*G11B 27/28*　　　(2006.01)

(52) U.S. Cl.
　　CPC ............ *G11B 27/34* (2013.01); *G06F 3/04842* (2013.01); *G11B 27/105* (2013.01); *G11B 27/28* (2013.01); *G06F 17/30843* (2013.01)

(58) Field of Classification Search
　　CPC .................. G11B 27/3081; G06F 3/04842
　　USPC .......................................... 715/700, 716, 730
　　See application file for complete search history.

(56) References Cited

U.S. PATENT DOCUMENTS

| | | | | |
|---|---|---|---|---|
| 5,956,026 | A * | 9/1999 | Ratakonda | 715/723 |
| 7,526,725 | B2 * | 4/2009 | Forlines | 715/723 |
| 2002/0097983 | A1 * | 7/2002 | Wallace et al. | 386/55 |
| 2002/0108112 | A1 * | 8/2002 | Wallace et al. | 725/40 |
| 2005/0229118 | A1 * | 10/2005 | Chiu et al. | 715/864 |
| 2007/0031062 | A1 * | 2/2007 | Pal et al. | 382/284 |
| 2007/0055986 | A1 * | 3/2007 | Gilley et al. | 725/34 |
| 2007/0078832 | A1 * | 4/2007 | Ott et al. | 707/3 |
| 2007/0078896 | A1 * | 4/2007 | Hayashi et al. | 707/104.1 |
| 2007/0168413 | A1 * | 7/2007 | Barletta et al. | 709/203 |
| 2007/0266843 | A1 * | 11/2007 | Schneider | 84/612 |
| 2008/0046925 | A1 * | 2/2008 | Lee et al. | 725/37 |
| 2008/0201645 | A1 * | 8/2008 | Francis et al. | 715/742 |
| 2008/0282186 | A1 * | 11/2008 | Basavaraju | 715/781 |
| 2008/0288494 | A1 * | 11/2008 | Brogger et al. | 707/7 |

(Continued)

OTHER PUBLICATIONS www.videosurf.com (last accessed May 18, 2009).

(Continued)

*Primary Examiner* — Tuyetlien Tran
*Assistant Examiner* — David S Posigian
(74) *Attorney, Agent, or Firm* — Kilpatrick Townsend & Stockton LLP (57) ABSTRACT

A video tapestry comprising a plurality of blended frames of a media presentation can be presented, with the frames comprising two or more frames displayed simultaneously. A dynamic tag cloud can be presented based on data identifying different portions of the tapestry for use in navigation or understanding the video content. A method can comprise obtaining a plurality of keywords for content of a media presentation, associating a first keyword with a first tag cloud and associating a second keyword with a second tag cloud, and generating a program component for providing a dynamic tag cloud using the first and second tag clouds. The program component can display the first tag cloud when the first portion of the video tapestry is referenced and the second tag cloud when the second portion of the video tapestry is referenced. The portions may be referenced by user input, a play head, or other activity.

22 Claims, 8 Drawing Sheets

(56) References Cited

U.S. PATENT DOCUMENTS

2009/0164301 A1* 6/2009 O'Sullivan et al. ............. 705/10
2009/0182727 A1* 7/2009 Majko ............................... 707/5
2009/0299725 A1* 12/2009 Grigsby et al. ................... 704/2
2010/0070860 A1* 3/2010 Alkov et al. .................... 715/716
2010/0088726 A1* 4/2010 Curtis et al. .................... 725/45
2010/0161620 A1* 6/2010 Lamere et al. ................. 707/749

OTHER PUBLICATIONS

U.S. Appl. No. 12/315,038, filed Nov. 26, 2008 and entitled "Video Content Summary,".

* cited by examiner

METHODS AND SYSTEMS FOR PREVIEWING CONTENT WITH A DYNAMIC TAG CLOUD

TECHNICAL FIELD

The disclosure below generally relates to graphics processing and display, particularly to displaying information about media presentations that include video content.

BACKGROUND

Various preview mechanisms have been proposed for use in displaying information about video content. For example, a thumbnail image comprising a frame from a video may be displayed in a video player. Descriptive information (e.g., title, author/producer, subject matter) associated with the whole video may be displayed alongside the video player. This information may not be sufficient to allow a user to quickly find a relevant video or navigate to a relevant portion thereof.

SUMMARY

In accordance with one or more aspects of the present subject matter, a video tapestry comprising a plurality of blended frames of a media presentation can be presented, with the frames comprising two or more frames from different portions of the presentation displayed simultaneously. A dynamic tag cloud can be presented based on data identifying different portions of the tapestry, which can allow for improved navigation and understanding of the video content of the media presentation.

Embodiments include a method comprising obtaining a plurality of keywords for content of a media presentation. For example, speech-to-text recognition may be performed, media presentation metadata may be analyzed, optical character recognition can be preformed on the visual content of the presentation, and/or user input may be utilized to obtain keywords. The method can further comprise associating a first keyword with a first tag cloud and associating a second keyword with a second tag cloud, and generating a program component for providing a dynamic tag cloud using the first and second tag clouds.

In some embodiments, data associating the first tag cloud with a first portion of a video tapestry and the second tag cloud with a second portion of the video tapestry can be used so that the first tag cloud is displayed when the first portion of the video tapestry is referenced and the second tag cloud is displayed when the second portion of the video tapestry is referenced. The portions may be referenced by user input, a play head, or other activity.

Embodiments also include systems and computer-readable media. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
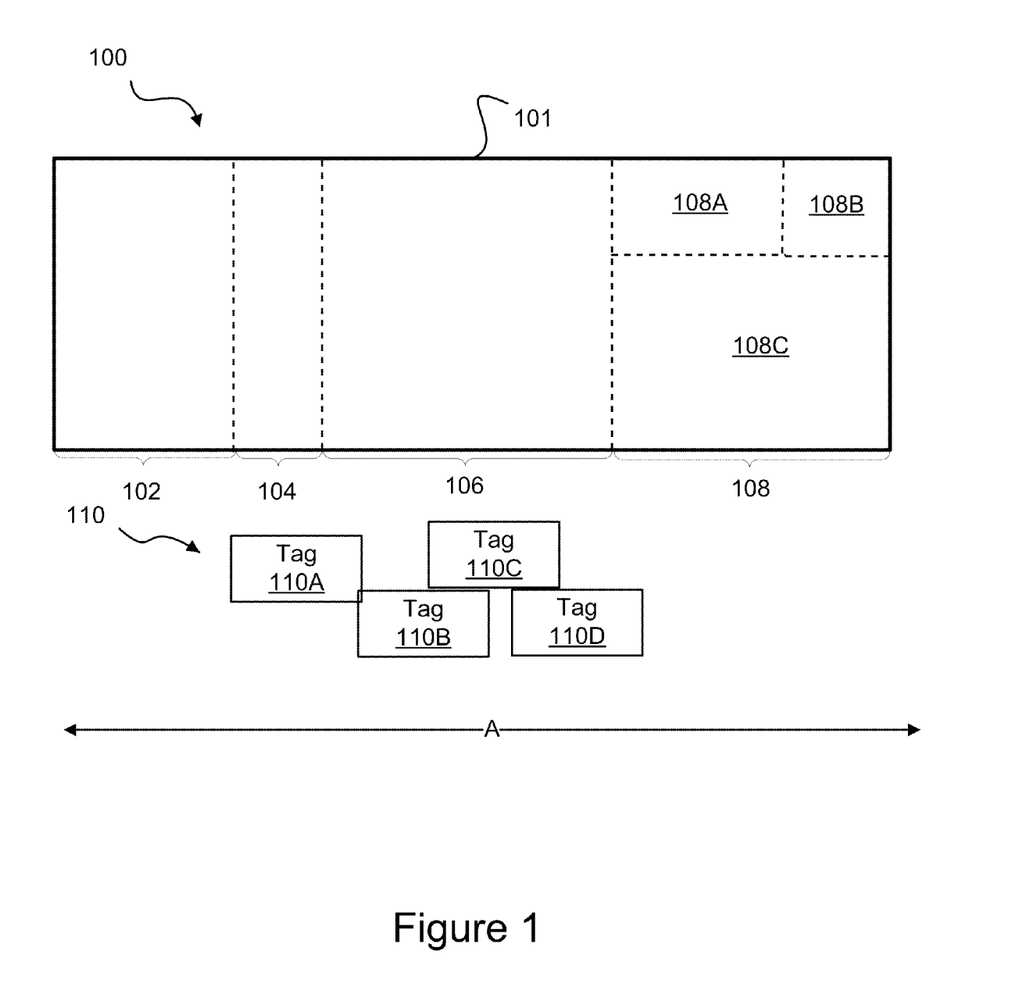
FIG. 1 is a block diagram schematically illustrating exemplary output that includes a video tapestry and a dynamic tag cloud.

FIG. 1 is a block diagram schematically illustrating exemplary output 100 that includes a video tapestry 101 and a dynamic tag cloud 110. As used herein, a "video tapestry" is meant to refer to visual output comprising a visual summary of a media presentation. For example, a video tapestry can comprise a plurality of blended frames from a media presentation comprising video content, the frames associated with different portions of the media presentation but displayed simultaneously to one another. Additional exemplary discussion of video tapestries can be found in U.S. patent application Ser. No. 12/315,038, filed Nov. 26, 2008 and entitled "Video Content Summary," which is incorporated by reference herein in its entirety. However, as noted herein, the present subject matter can be used alongside any visual element having a plurality of portions that correspond to portions of a media presentation of any type.

In this example, video tapestry 101 comprises a plurality of portions 102, 104, 106, and 108 extending along a horizontal axis A. For instance, each portion 102, 104, 106, and 108 may correspond to one or more key frames from a different time interval of the media presentation. For example, the frames of a media presentation may be sampled for every five minutes of content and one or more key frames generated for each five-minute interval. Of course, any number of key frames and intervals could be used, and the intervals may vary. Non-key frames could be used as well in some embodiments. Additionally, the relative size of the portions to one another can vary as well.

Each portion may comprise one or more frames or frame portions of the media presentation that are blended together to achieve a continuous appearance and provide a visual summary of the presentation. For instance, in some embodiments, the overall effect may result in a layout of features from different frames blended together so that the summary is without uniform or regular borders between frames. In some embodiments, though, borders could be used or indicated.

For purposes of illustration, portion 108 is shown having sub-portions 108A, 108B, and 108C to indicate that different layouts within a tapestry may be used. For instance, in some embodiments, a video tapestry can support zoom levels to further enhance the visual summary effect. Each sub-portion 108A, 108B, 108C may represent a different zoomable or zoomed portion. Additionally or alternatively, sub-portions 108A-C may represent different frames from the same time interval.

Although video tapestry 101 is illustrated in this example as extending horizontally, a video tapestry may extend in one or more directions. For instance, a video tapestry may extend vertically, diagonally, and/or may feature internal layouts (e.g., zig-zag, brick patterns) for frames of the media presentation.

In accordance with one or more aspects of the present subject matter, output 100 also includes a dynamic tag cloud 110, in this example comprising a plurality of tags 110A, 110B, 110C, and 110D. As will be discussed below, a dynamic tag cloud can comprise one or more keywords, with the contents of the tag cloud changing based on data identifying a portion of the video tapestry. For instance, a user may move a play head from a first portion (e.g., 102) to another portion (e.g., 104) or the play head may move in conjunction with playback of the video in the same or a separate window. As the play head moves or is moved, the contents of dynamic tag cloud 110 can change based on the location of the play head. For example, the relative position of the play head can correspond to a particular time code within the presentation, with the tag cloud composition changing based on a given tag's (or tag cloud's) proximity to the playhead position. This may allow a user to more easily browse the video content as compared to viewing the video tapestry alone.

Figure 2:
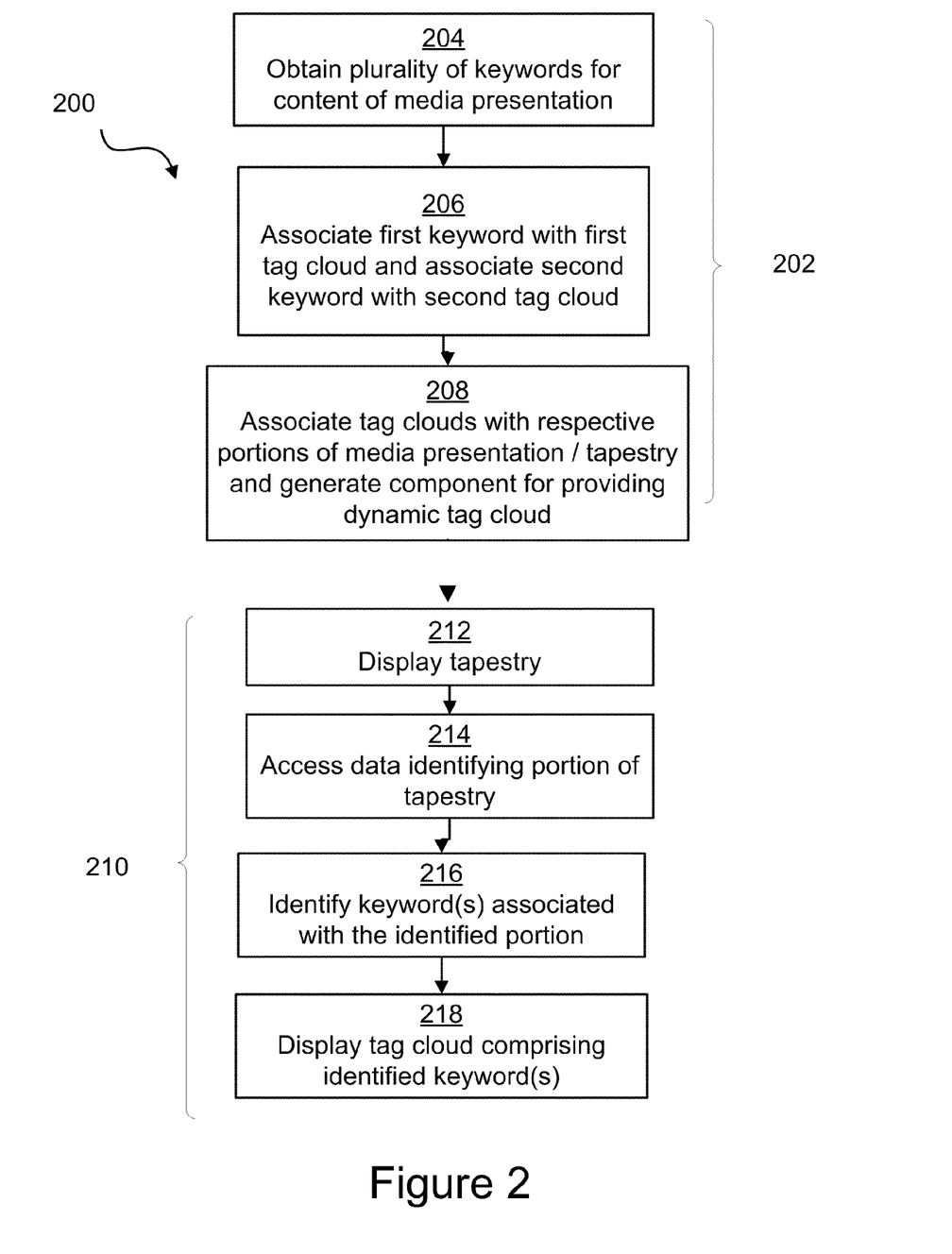
FIG. 2 is a flowchart illustrating exemplary steps in an method for providing dynamic tag clouds.

FIG. 2 is a flowchart illustrating exemplary steps in an overall method 200 for providing dynamic tag clouds. In this example, a flow 202 represents an example of a flow for producing one or more components for providing dynamic tag clouds, while flow 210 represents an example of displaying a dynamic tag cloud. Flow 210 may follow 202 at the same device or system or the flows may be carried out by separate components and at different times.

As an example, flow 202 may be carried out by a server computer or developer computer when a tapestry is assembled as part of a video development process. Flow 210 may occur when a user interacts with the tapestry at a user device. As another example, a server may carry out flow 202 to generate a tapestry and components for a tag cloud and then carry out flow 210 when serving video content and/or pages for browsing content in response to input received from a user.

Block 204 represents obtaining a plurality of keywords for content of a media presentation that will be associated with a video tapestry. For example, one or more audio components of the media presentation may be subjected to speech-to-text conversion. As another example, existing transcript data may be accessed, such as closed-captioning transcript data or a production script for the media presentation. Additionally or alternatively, an interface (e.g., text input form) may be presented for a user to provide keywords during playback of a video or review of the video tapestry.

Block 206 represents defining a plurality of tag clouds by associating at least a first keyword with a first tag cloud and at least a second keyword with a second tag cloud. In practice, any number of tag clouds may be defined, and each tag cloud may have any number of keywords. Any amount of overlap of keyword content between tag clouds may occur, including full, partial, and no overlap.

Block 208 represents associating the tag clouds with respective portions of the media presentation and/or with respective portions of the tapestry and generating a component for providing a dynamic tag cloud using the tag clouds.

In some embodiments, each tag cloud is associated with a respective portion of the media presentation directly. For example, a tag cloud may be indexed to a particular time interval or time value (e.g. frame number) for the media presentation. As another example, in some embodiments, tag clouds are mapped to portions of the video tapestry. For example, a tag cloud may be indexed to a particular coordinate or coordinate range for the video tapestry corresponding to a particular key frame.

As a particular example, for each key frame, speech-to-text data, transcript data, and/or other keyword sources can be consulted to determine keywords associated with the time interval which the key frame represents. For example, if a key frame is generated for each five-minute segment of a media presentation, the keywords with timestamps for the 2.5 minutes preceding and following the key frame may be included in the tag cloud associated with that key frame.

Figure 3:
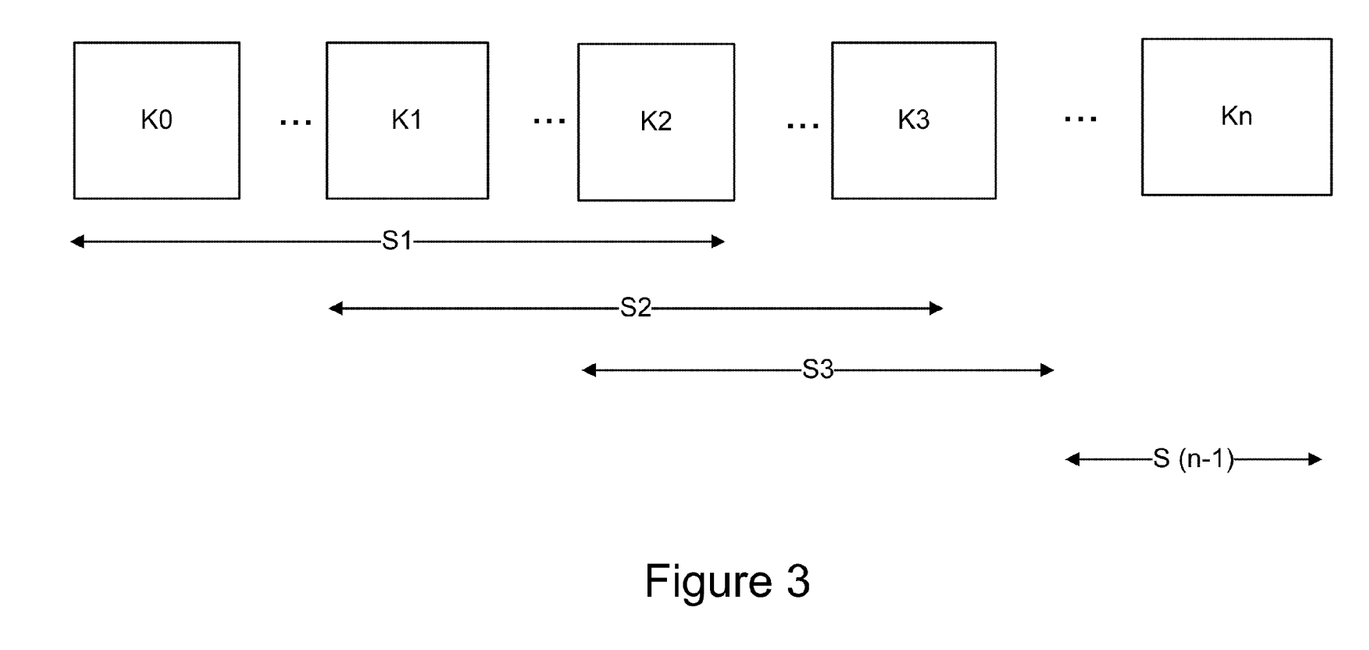
FIG. 3 illustrates an example of mapping time segments to key frames.

In some embodiments, tag clouds are generated using overlapping segments. For example, FIG. 3 illustrates a plurality of key frames K0, K1, K2, K3, and Kn extracted from video content of a media presentation. Overlapping segments are defined for use in obtaining keywords to be included in dynamic tag clouds corresponding to each key frame. In this example, segment S1 is defined as the interval from key frame K0 to K2, segment S2 is defined as the interval from key frame K1 to K3, and segment S3 is defined as the interval from key frame K2 to a frame K4 that is not illustrated but lies between K3 and Kn. The final segment, S(n−1) is defined between a frame K(n−2) (not shown in FIG. 3) and the final key frame Kn.

For example, if there are eleven key frames (n=10), the segments can be defined as follows: S1 from K0 to K2; S2 from K1 to K3; S3 from K2 to K4; S4 from K3 to K5; S5 from K4 to K6; S6 from K5 to K7; S7 from K6 to K8; S8 from K7 to K9; and S9 from K8 to K10. Of course, any suitable correlation between key frames and segments can be used in various embodiments and this is for example only.

For each segment, speech-to-text and/or metadata (e.g., shooting script, user annotations) can be used to compose a static tag cloud for that segment. Then, the static tag clouds can be stored for use in outputting a dynamic tag cloud. In some embodiments, the tag cloud for the segment "centered" on the currently-referenced key frame is displayed. For example, data can be stored so that when a play head or other activity identifies a portion of the tapestry corresponding to key frame K2, then the tag cloud for segment S2 is displayed, since S2 is defined from K1 to K3 and is thus centered on K2. For key frames that are not "centered" over a segment (i.e., key frames K0 and Kn), then the tag cloud for the adjacent segment (S1 and S(n−1), respectively) can be displayed.

In some embodiments, the dynamic tag cloud can include tags associated with multiple segments. This technique can help reduce the appearance of abrupt changes in tag cloud composition. As an example, multiple segments are used if the tag cloud for the segment "centered" on a key frame does not include one or more of the same tags as the adjacent cloud.

For instance, when the portion including key frame K1 is identified, the tag cloud for S1 (centered on K1) and also S2 can be used for display of the dynamic tag cloud. As a further example, when the portion including key frame K2 is identified, the dynamic tag cloud can include the S1, S2, and S3 tag clouds. When the portion including key frame K3 is identified, the dynamic tag cloud can include the S2, S3 and S4 tag clouds, and so on.

Returning to FIG. 2 and block 208, generating a component for providing the dynamic tag cloud can comprise storing program code and/or data in a computer-readable medium for later use in selecting one of the tag clouds based on data directly or indirectly identifying a portion of the media presentation. For example, component for a rich internet application, such as a component for use in an ADOBE® FLASH® or AIR® application can be generated so that, when utilized, the component accesses one or more stored tag clouds based on data identifying a portion of a tapestry or data identifying a time value or interval in the media presentation. FLASH® and AIR® are available from Adobe Systems Incorporated of San Jose, Calif.

Some implementations may optimize this approach by identifying keywords that appear in adjacent tag clouds and assigning output coordinates so that keywords that appear in adjacent tag clouds appear at or near the same location. This may aid users by reducing the possibility of tags jumping around.

In some embodiments, generating a component for providing the dynamic tag cloud can comprise storing data associating keywords with particular portions of the tapestry and/or with particular portions of the media presentation directly. This data can then be used to dynamically generate the tag clouds from the keywords at runtime rather than relying on previously-generated tag clouds.

Flow 210 represents an example of providing output comprising a dynamic tag cloud. At block 212, a video tapestry is displayed. For example, data such as vector or raster graphics can be accessed so that the tapestry is displayed in an interface. Block 214 represents accessing data identifying a portion of the tapestry.

For example, the interface may include a play head positioned on or alongside the tapestry. By repositioning the play head, a user can select different portions of the tapestry and/or the play head may move along the tapestry in time with playback of the media presentation. The data identifying a portion of the tapestry can be determined from the position of the play head.

As another example, the data representing a portion of the video tapestry can be determined from a user gesture received via the interface. For example, a user gesture may comprise a user clicking in or near the tapestry, hovering over a portion of the tapestry, or dragging an item to or from the tapestry.

The data representing a portion of the video tapestry may or may not map directly to the precise location of the play head, user gesture, or other input. For instance, when a location is identified, the corresponding portion of the video tapestry may include the location plus or minus a surrounding area on one or more sides of the location. For example, in the case of a horizontally-extending tapestry, the corresponding portion of the tapestry may have a width greater than, equal to, or less the width of the play head. Similarly, if a user hovers over a coordinate, the corresponding portion of the tapestry may comprise a coordinate range including the coordinate over which the user hovers.

For example, a tapestry may be generated based on a high sample rate for key frames, such as a key frame for each 15 seconds of the media presentation. Accordingly, each tag cloud may be associated with a short interval. If the play head is at a given key frame, the displayed tag cloud may be generated from tag clouds for the key frame and from the tag clouds for one or more adjacent key frames as well.

Block 216 represents identifying one or more keywords (if any) associated with the portion. For example, in some embodiments block 216 comprises identifying a previously-stored tag cloud and corresponding to the portion by selecting the tag cloud from a plurality of tag clouds, without selecting the keyword(s) directly. Particularly, in some embodiments, the different portions of the video tapestry correspond to different time intervals of the media presentation, and the tag cloud is identified by finding a tag cloud associated with the time interval corresponding to the portion of the tapestry. As another example, tag clouds may be directly mapped to coordinates or coordinate ranges of the tapestry.

As a further example, in some embodiments previously-generated tag clouds need not be used. Rather, block 216 can comprise identifying one or more keywords directly, such as identifying one or more keywords associated with the time interval that corresponds to the portion of the video tapestry.

Block 218 represents displaying the tag cloud comprising the identified keyword(s). For instance, if a previously-generated tag cloud is used, the keywords for that tag could can be accessed and data representing the keywords and output coordinates can be used to generate suitable signals to output the keywords on a screen or other display.

In some embodiments, tag clouds are assembled dynamically at runtime using directly-identified keywords. Thus, block 218 can represent determining positions for one or more keywords associated with the identified portion of the video tapestry and providing output signals to display the keywords in a tag cloud.

Figure 4:
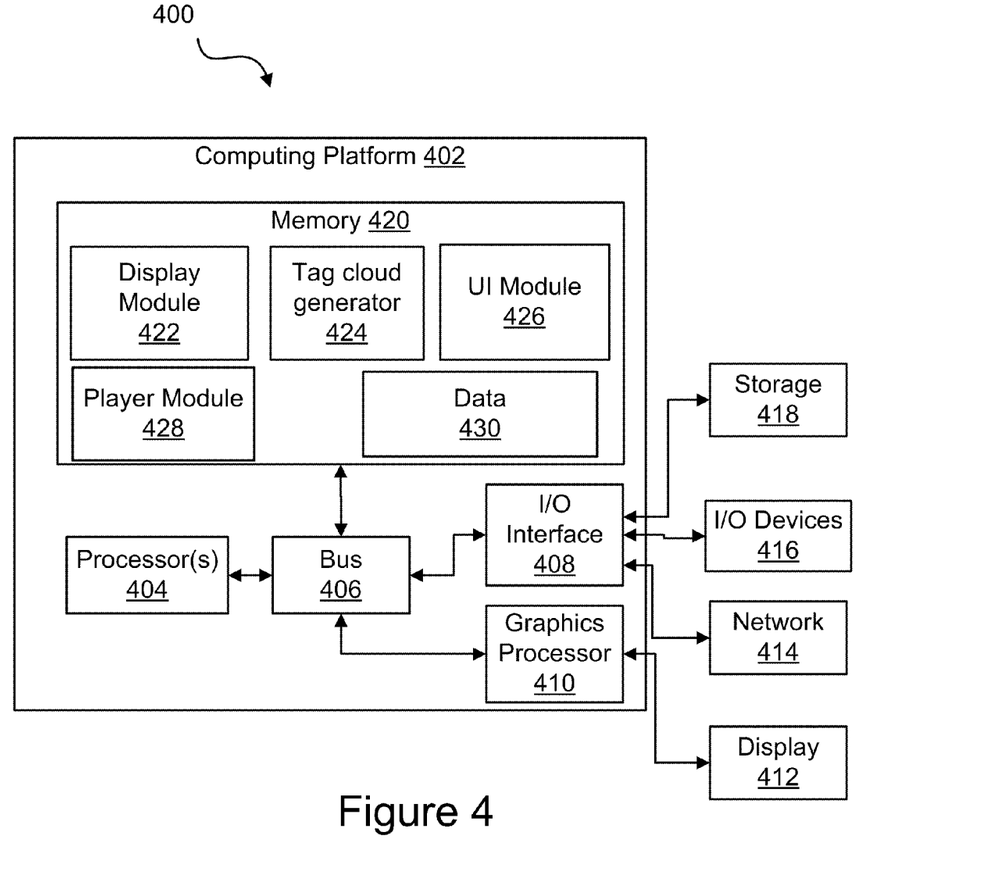
FIG. 4 is a block diagram illustrating an example of a computing system for use in generating and/or viewing dynamic tag clouds.

FIG. 4 is a block diagram illustrating an example of a computing system 400, which in this example is configured to provide a dynamic tag cloud and video tapestry. In this example, computing system 400 includes a computing device 402 comprising one or more processors 404, a bus 406, memory 420, input-output (I/O) handling components 408, a display 412, user input (UI) devices 416 (e.g., a mouse, keyboard, touch screen interface, etc.), one or more networking or other interfaces 416 (e.g., Ethernet, USB, etc.), and storage 418 (e.g., hard disk, optical drive(s)). Memory 420 represents one or more computer-readable media accessible by processor(s) 404.

Memory 420 embodies several program components, including a display module 422 configured to cause the computing system to display a video tapestry comprising a plurality of blended frames of a media presentation. Tag cloud generation module 424 can cause to computing system to access data representing a portion of the tapestry, such as data identifying position along or within the video tapestry and provide data to display module 422 for displaying a tag cloud comprising at least one keyword associated with the portion, such as using one or more routines configured in accordance with flow 410.

For example, as was noted above, static tag clouds may be mapped to a particular time interval. Tag cloud generator module 424 may determine one or more time intervals of the media presentation associated with the identified portion of the tapestry and determine which static tag cloud(s) (or keywords) to use in creating a dynamic tag cloud that is displayed by display module 422. For example, the static tag clouds, keywords, and timing data may be included in data 430.

User interface module 426 can be configured to provide an interface for receiving data representing user input. For example, use interface module 426 may be operative to provide data representing user gestures (e.g., clicks, hovers, dragging) relative to the video tapestry and/or other components being displayed. Thus, user input can be used to identify the portion of the tapestry for use in generating the dynamic tag cloud. For instance, the interface may comprise a play head positioned relative to the video tapestry and data representing a position along or within the video tapestry can to the position of the play head.

FIG. 4 also illustrates a video player module 428 configured to play the media presentation. For instance, video player module 428 can be configured to access streaming or stored video data and generate appropriate signals for providing video and/or audio output. Tag cloud generator module 424 can be configured to update contents of the tag cloud while playing occurs so that the tag cloud as displayed comprises at least one keyword associated with a currently-output time interval of the media presentation. However, a video player module may not be necessary.

For example, in some embodiments, the video tapestry and tag cloud functionality can be used alone without necessarily playing back the presentation. Particularly, a web page or other interface component may present the tapestry and tag clouds for interaction with a user with or without video playback. For instance, clicking on the tapestry may generate data for output to another program component or another device identifying a portion of the media presentation. The other component/device may use the data for another purpose or as a reference point for playing back the media presentation, selecting the corresponding portion(s) of the presentation for editing/copying, etc.

In some embodiments, modules 422, 424, 436, and 428 are components of a video playback application, such as a video player that is executable via the ADOBE® FLASH® or AIR® runtime environment, or executable as a standalone application. Memory 420 can further embody additional components and/or data such as an operating system, runtime environment, and other applications. For example, the video playback components may be configured for use as a browser plug-in; accordingly, memory 420 can include a browser or other application.

The exemplary architecture of computing system 400 may also be used in developing components used to provide a dynamic tag cloud. For example, memory 420 may embody a video development application that includes a user interface for a user to select one or more media presentations from which to generate a video tapestry. The video development application may also include one or more modules configured to obtain keywords. For example, the keyword module can present an interface for inputting keywords directly. The keyword module may include or invoke a speech-to-text engine and/or may access metadata, such as a script or other data for the media presentation.

The keywords can be indexed to particular portions of the media presentation (e.g., by timestamp, frame number, etc.) and can be associated with one or more segments that are used to generate static tag clouds. A tag cloud packaging module can store data identifying the static tag clouds and corresponding key frames and/or time intervals of the media presentation. The video development application may include an output module for generating program components (e.g., the FLASH® or AIR® application noted above) or outputting data for generation of such components using another application (e.g., a development application such as ADOBE® FLASH® BUILDER™, available from Adobe Systems Incorporated of San Jose, Calif.).

Figure 5:
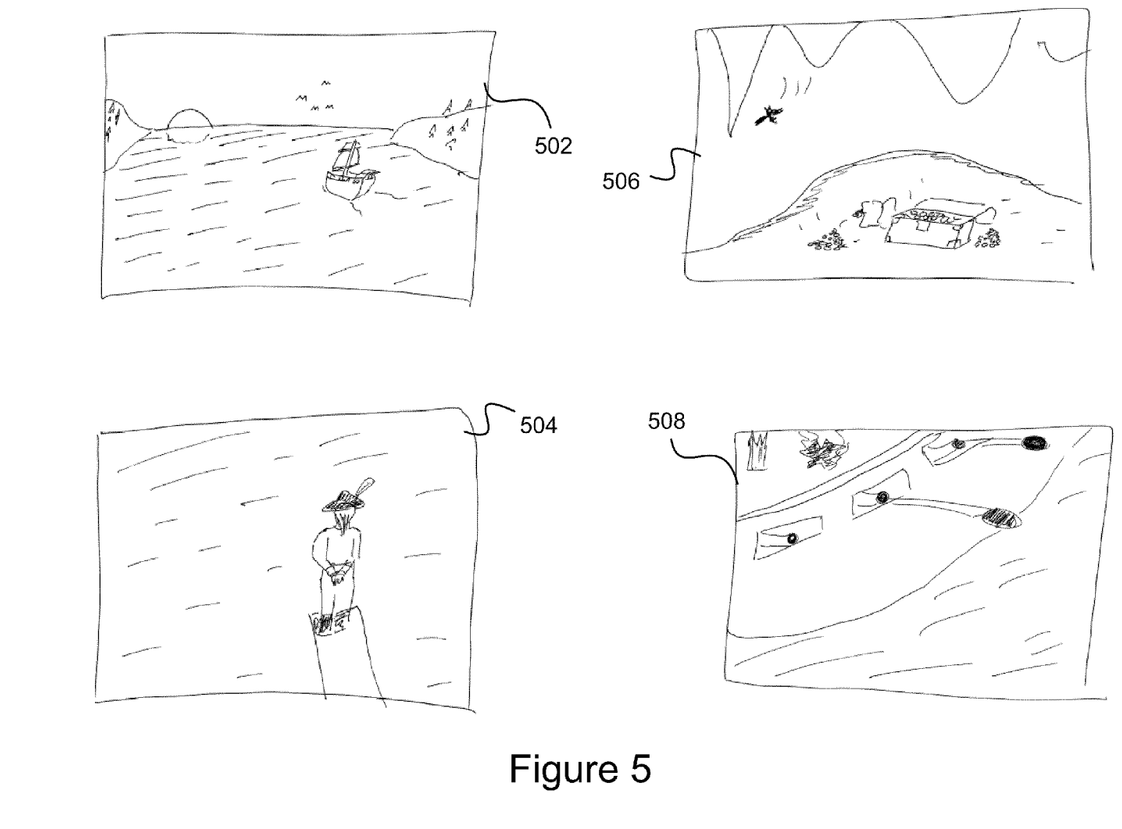
FIG. 5 illustrates four exemplary key frames from a hypothetical media presentation.

FIG. 5 illustrates four exemplary key frames 502, 504, 506, and 508 from a hypothetical media presentation. In this example, the hypothetical media presentation relates to a hypothetical pirate movie in a video format. Key frame 502 may be representative of the first five minutes of the presentation (00:00-04:59) and depicts a pirate ship sailing out to sea. Key frame 504 reflects a scene in the next five minutes (05:00-09:59) during which a character must walk the plank. Key frame 506 reflects a scene in the next five minutes (10:00-14:59) in which a treasure is discovered, while key frame 508 reflects a scene in the final five minutes (15:00-19:59) during which a battle scene occurs.

Figure 6A:
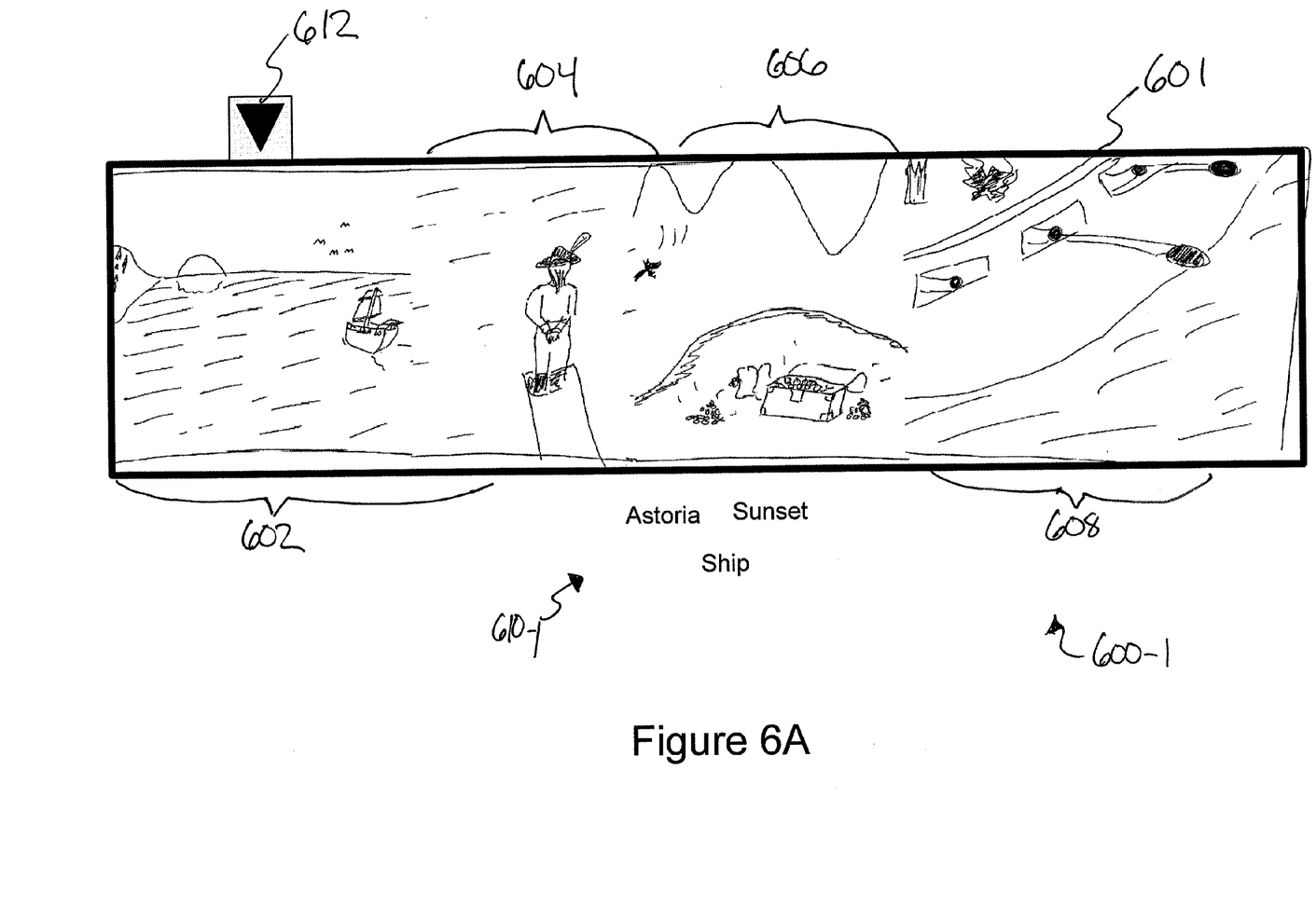
FIGS. 6A-6B illustrates additional exemplary output comprising a tapestry using the key frames shown in FIG. 4 plus a dynamic tag cloud.

FIG. 6A illustrates exemplary output 600-1 in which a video tapestry 601 has been provided based on key frames 502, 504, 506, and 508, which have been blended together into a continuous image. Key frame 502 occupies portion 602 of tapestry 601, key frame 504 occupies portion 604 of tapestry 601, key frame 506 occupies portion 606 of tapestry 601, and key frame 508 occupies portion 608 of tapestry 601.

Output 600-1 also includes a tag cloud 610-1 generated based on the position of play head 612 relative to tapestry 601. In this example, the horizontal axis of tapestry 601 corresponds to time, with the beginning of the media presentation on the left and the end on the right. Play head 612 is positioned to identify portion 602, which corresponds to key frame 502. Thus, tag cloud 610-1 comprises keywords "Astoria", "Sunset", and "Ship." These keywords may be generated based on speech-to-text conversion that recognizes spoken dialog referring to the ship and sunset. The "Astoria" keyword may have been derived from dialog, the shooting script, or metadata for the media presentation indicating a shooting location.

Figure 6B:
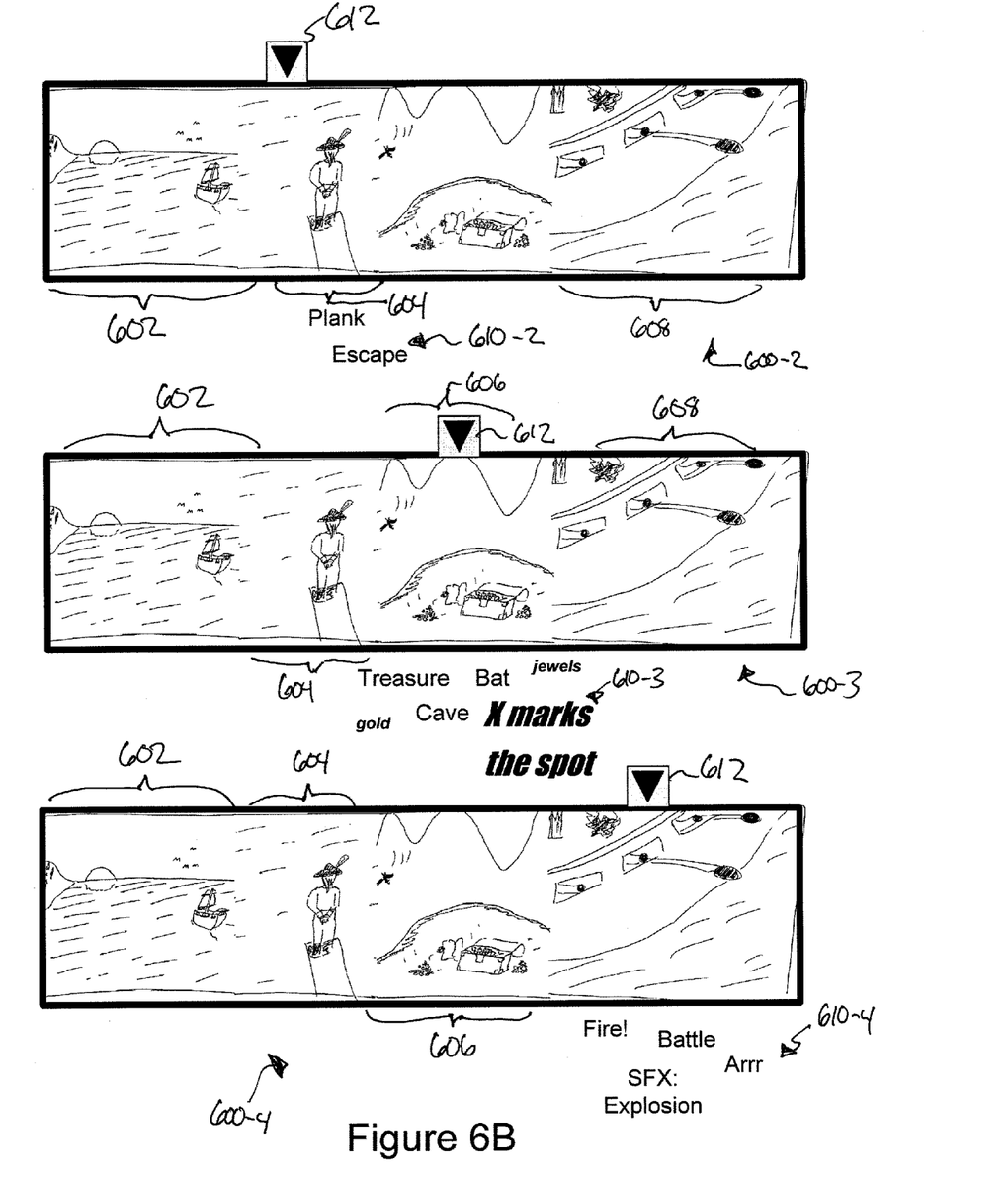

FIG. 6B illustrates additional exemplary output 600-2, 600-3, and 600-4 including respective tag clouds 610-2, 610-3, and 610-4 displayed based on changing positions of play head 612. In this example, the relative position of tag clouds 610 changes with the play head, although in some embodiments the tag cloud maintains a single position relative to the tapestry, such as bottom-center.

The tag cloud may, of course, be displayed at any position relative to the tapestry, may overlay the tapestry, or may be displayed in a separate window or interface component. As another example, the dynamic tag cloud may display a tag cloud corresponding to multiple key frames, with visual effects used to highlight the "current" tag cloud. For example, in such an embodiment, output 600 could include tag clouds 610-1, 610-2 610-3, and 610-4. When play head 612 is positioned at portion 602, 604, 606, and then 608, the respective keywords of tag clouds 610-1, 610-2, 610-3, and 610-4 could be highlighted, enlarged relative to the other tag clouds, animated, or otherwise affected in order to draw user attention.

The tag clouds as illustrated include a mix of keywords that may have been generated from dialog (e.g., "Plank", "Treasure", "X marks the spot", "Fire!", "Arrr" may comprise spoken dialog) and metadata/speech to text (e.g., "Escape", "Cave", and "Battle" may comprise scene titles, descriptive text from the script or metadata, while "SFX: Explosion" may refer to an expression of a sound effect in the transcript).

As shown, a "keyword" may comprise one or more words. Keywords may utilize any suitable language(s) and may include symbols or graphics. Additionally, although plain text is shown at 610-2 and 610-4, the keyword data may include formatting data for display of keywords using different sizes, fonts, effects, etc. For example, as shown at 610-3, the keyword "X marks the spot" is shown in larger size and first font, keywords "Treasure," "Bat," and "Cave" are shown in a medium size and second font, and keywords "jewels" and "gold" are shown in a smaller size and third font.

Figure 7:
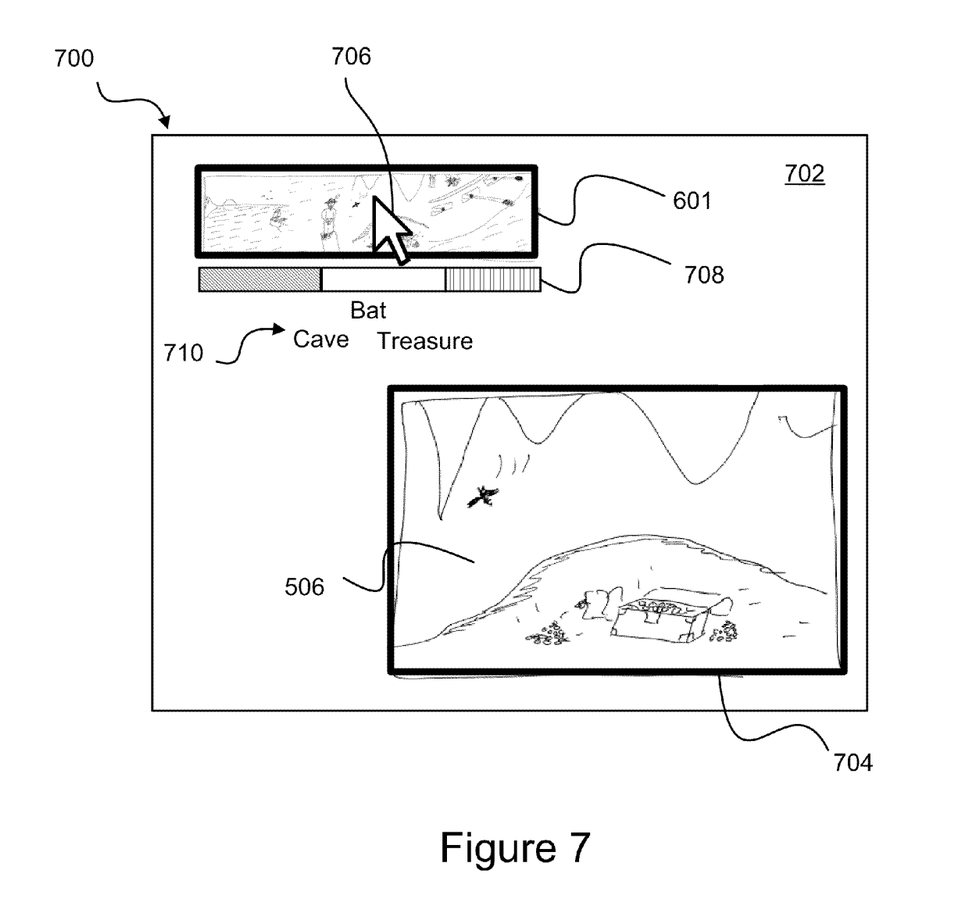
FIG. 7 illustrates an exemplary user interface provided via a display for viewing and using a video tapestry and dynamic tag cloud.

FIG. 7 illustrates an exemplary user interface 700 provided via a display 702 interfaced to a computing device (not shown). In this example, a video playback window 704 is included in the display along with video tapestry 601. A user has provided a gesture via pointer 706 to click or hover over a portion of the video tapestry corresponding to key frame 506. Accordingly, dynamic tag cloud 710 comprises keywords associated with key frame 506. In this example, clicking on the tapestry at this portion has caused video player 704 to begin playback of the media presentation at a point corresponding to key frame 506.

Interface 700 further includes a hot bar 708 positioned alongside tapestry 601 and including different colors as indicated by the different shading. In some embodiments, user interest in different portions of the video can be reflected using different interface effects (e.g., different colors, shading, patterns, animations, etc.) in hot bar 708. User interest may be tracked, for example, by counting the number of clicks, hovers, or other gestures relative to portions of tapestry 601. As an example, the number of times a particular portion of the tapestry is used to begin playback can be tracked. This may allow the more (or less) popular portions of a media presentation to be tracked by viewers, producers, and other users.

Interface 700 can be provided by any suitable computing system. For example, interface 700 may represent a web page or media player application obtained from one or more servers by a client device interfaced to display 702. In some embodiments, a plurality of video tapestries can be presented on a web page or other interface to allow browsing of various media presentations. Each video tapestry can include a corresponding dynamic tag cloud. When a user clicks in a particular video tapestry, video player 704 can be triggered to begin playback of the media presentation corresponding to the selected video tapestry at the selected point.

As another example, interface 700 may represent video output from a computing device playing local content. For example, the computing device may comprise a computer, cellular telephone, or a video playback device, such as a DVD player, television, portable medial player, or set-top-box. For example, in response to a pause, rewind, fast-forward, or other playback command, the video playback device may render a video tapestry alongside or overlaying the playback window to allow a user to view tag clouds while browsing to another portion of the media presentation.

Several examples above discuss a video tapestry used to summarize content of a media presentation comprising video, with different portions corresponding to different frames of the video presentation. It will be appreciated that the present subject matter can be used alongside any visual element summarizing a media presentation and having a plurality of portions that correspond to sub-elements of the media presentation, which can be of any type. For example, a media presentation may comprise a plurality of still images summarized by a visual element; rather than "frames," the portions of the summary may comprise the various images. As another example, the media presentation may comprise a document, such as a text, HTML, or other document such as a slide show; rather than frames, the portions can comprise page images or portions of pages from the document. As a further example, the visual summary may comprise different screens of a user interface; rather than frames, the different screens can be used for the summary.

Keywords can be generated in any suitable way. As was noted above, if a media presentation is associated with one or more audio sources, audio recognition can be used. Metadata such as script or other information can be used as well. If the presentation comprises text documents, the tags can comprise snippets of text (e.g., titles, headings, captions, etc.) and/or metadata associated with the documents. Optical character recognition can be used to identify text of any type, whether in video, visual, or textual documents comprising the media presentation.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising:

displaying a video tapestry comprising a plurality of blended frames of a media presentation comprising video content, the video content comprising a plurality of frames, the plurality of blended frames of the media presentation being simultaneously displayed in the video tapestry, wherein the plurality of blended frames is a first subset of the plurality of frames of the video content of the media presentation which does not include another subset of the plurality of frames of the video content of the media presentation;

wherein the plurality of blended frames comprises a plurality of frame pairs, each frame pair comprising a respective first frame from the first subset of the plurality of frames of the video content and a respective second frame from the first subset of the plurality of frames of the video content, wherein the respective second frame is not adjacent to the respective first frame in the plurality of frames;

wherein, for each frame pair, a respective first content portion of the respective first frame and a respective second content portion of the respective second frame are blended together such that the plurality of blended frames forms a visually continuous image summarizing the media presentation;

determining, based on accessing data that groups subsets of the plurality of blended frames into a plurality of portions of the video tapestry, that an overlap portion of the video tapestry has been identified by an input received via an interface in which the video tapestry is displayed, wherein the overlap portion comprises at least two portions from the plurality of portions of the video tapestry each having at least one common frame; and responsive to determining that an overlap portion of the video tapestry has been identified by the input received via the interface:

identifying a first tag cloud associated with a first portion in the overlap portion and a second tag cloud associated with a second portion in the overlap portion, and displaying simultaneously the first and second tag clouds based at least in part on the first and second portions being in the overlap portion, wherein the first tag cloud is generated from a first text portion of a transcript of the video content that corresponds to the first portion in the overlap portion and the second tag cloud is generated from a second text portion of the transcript of the video content that corresponds to the second portion in the overlap portion.

2. The method set forth in claim 1, wherein the plurality of portions of the video tapestry respectively correspond to different time intervals of the media presentation, and wherein identifying each of the first and second tag clouds comprises determining that each of the first and second tag clouds is associated with a respective corresponding time interval of the media presentation.

3. The method set forth in claim 1, further comprising:

providing the interface comprising a play head and display area, wherein the video tapestry is displayed in the display area of the interface, wherein the data referring to the overlap portion of the video tapestry corresponds to a position of the play head relative to the display area, wherein the input received via the interface causes the play head to be moved to the position.

4. The method set forth in claim 3, further comprising:
receiving data representing additional input changing the position of the play head to a different position relative to the display area; and
displaying a different tag cloud that includes tag clouds associated with portions in a different overlap portion of the video tapestry referenced by data corresponding to the different position of the play head.

5. The method set forth in claim 1, wherein each of the first and second tag clouds comprises a respective plurality of tags, each tag of the respective plurality of tags being associated with multiple portions of the video tapestry.

6. A method, comprising:
obtaining a plurality of keywords associated with content of a media presentation, the content comprising a plurality of visual elements;
associating a first keyword with a first tag cloud and associating a second keyword with a second tag cloud; and
generating a program component configured for providing a dynamic tag cloud including the first and second keywords based on data associating the first tag cloud with a first portion of the media presentation and the second tag cloud with a second portion of the media presentation, wherein the first and second portions are overlapping, wherein the first portion overlapping the second portion comprises the first and second portion including at least one common visual element, the program component further configured for generating output coordinates for displaying the dynamic tag cloud in response to determining that an input has been received via an interface in which the media presentation is displayed and that the input indicates a selection of the overlapping first and second portions of the media presentation;
generating a video tapestry that comprises the first and second portions of the media presentation, wherein generating the video tapestry comprises:
sampling the first portion from a first set of frames from the media presentation and sampling the second portion from a second set of frames from the media presentation, wherein the first portion and the second portion do not include adjacent frames of the media presentation; and
blending a first content portion from the first portion of the media presentation and a second content portion from the second portion of the media presentation such that the blended first and second portions form a visually continuous image summarizing the media presentation;
wherein obtaining the plurality of keywords comprises:
accessing data comprising a transcript of the media presentation;
selecting the first keyword from a first transcript portion corresponding to the first portion of the media presentation; and
selecting the second keyword from a second transcript portion corresponding to the second portion of the media presentation.

7. The method set forth in claim 6, wherein obtaining the plurality of keywords comprises performing speech recognition on an audio component of the media presentation.

8. The method set forth in claim 6, wherein obtaining the plurality of keywords comprises receiving additional user input via the interface.

9. The method of claim 6, wherein the plurality of visual elements comprises a plurality of frames and the at least one common visual element comprises at least one common frame.

10. The method of claim 6, further comprising:
identifying at least one keyword included in both (i) at least one of the first and second tag clouds and (ii) a third tag cloud;
assigning additional output coordinates to the third cloud such that the at least one keyword appears at or near the same location in both (i) a display of the dynamic tag cloud including keywords from the first and second tag clouds and (ii) an additional display of the dynamic tap cloud including keywords from the third tag cloud and at least one of the first and second tag clouds.

11. A non-transitory computer-readable medium tangibly embodying program code executable by a processor of a computing device, the computer-readable medium comprising:
program code for displaying a video tapestry comprising a plurality of blended frames of a media presentation comprising video content, the video content comprising a plurality of frames, the plurality of blended frames of the media presentation being simultaneously displayed in the video tapestry, wherein the plurality of blended frames is a first subset of the plurality of frames of the video content of the media presentation which does not include another subset of the plurality of frames comprising of the video content of the media presentation;
wherein the plurality of blended frames comprises a plurality of frame pairs, each frame pair comprising a respective first frame from the first subset of the plurality of frames of the video content and a respective second frame from the first subset of the plurality of frames of the video content, wherein the respective second frame is not adjacent to the respective first frame in the plurality of frames;
wherein, for each frame pair, a respective first content portion of the respective first frame and a respective second content portion of the respective second frame are blended together such that the plurality of blended frames forms a visually continuous image summarizing the media presentation;
program code for determining, based on accessing data that groups subsets of the plurality of blended frames into a plurality of portions of the video tapestry, that an overlap portion of the video tapestry has been identified by an input received via an interface in which the video tapestry is displayed, wherein the overlap portion comprises at least two portions from the plurality of portions of the video tapestry each having at least one common frame; and
program code for responding to determining that an overlap portion of the video tapestry has been identified by the input received via the interface:
identifying a first tag cloud associated with a first portion the overlap portion and a second tag cloud associated with a second portion in the overlap portion, and
displaying simultaneously the first and second tag clouds based at least in part on the first and second portions being in the overlap portion, wherein the first tag cloud is generated from a first text portion of a transcript of the video content that corresponds to the first portion in the overlap portion and the second tag cloud is generated from a second text portion of the transcript of the video content that corresponds to the second portion in the overlap portion.

12. The non-transitory computer-readable medium set forth in claim 11,
wherein the plurality of portions of the video tapestry respectively correspond to different time intervals of the media presentation, and
wherein identifying each of the first and second tag clouds comprises determining that each of the first and second tag clouds is associated with a respective corresponding time interval of the media presentation.

13. The non-transitory computer-readable medium set forth in claim 11, further comprising program code for providing the interface comprising a play head and display area, wherein the video tapestry is displayed in the display area of the interface, wherein the data referring to the overlap portion of the video tapestry corresponds to a position of the play head relative to the display area, wherein the non-transitory computer-readable medium further comprises program code for causing the play head to be moved to the position in response to the input received via the interface.

14. The non-transitory computer-readable medium set forth in claim 13, further comprising:
program code for receiving data representing additional input changing the position of the play head to a different position relative to the display area; and
program code for displaying a different tag cloud that includes tag clouds associated with portions in a different overlap portion of the video tapestry referenced by data corresponding to the different position of the play head.

15. The non-transitory computer-readable medium set forth in claim 11, further comprising program code for providing the interface, wherein the video tapestry is displayed in the interface and the data referring to the overlap portion is determined from a user gesture received via the interface.

16. The non-transitory computer-readable medium set forth in claim 11, wherein displaying the first and second tag clouds comprises displaying a tag cloud generated from the identified first and second tag clouds, each of the identified first and second tag clouds is associated with a respective time interval of a plurality of overlapping time intervals of the media presentation, wherein the at least one common frame in the identified overlap portion of the video tapestry lies within the time intervals.

17. A computing system comprising:
a hardware processor; and
a non-transitory computer-readable medium communicatively coupled to the processor embodying program instructions;
wherein the hardware processor is configured to execute the program instructions to perform operations comprising:
rendering a video tapestry for display, the video tapestry comprising a plurality of blended frames of a media presentation comprising video content, the video content comprising a plurality of frames, the plurality of blended frames of the media presentation being simultaneously displayed in the video tapestry, wherein the plurality of blended frames is a first subset of the plurality of frames of the video content of the media presentation which does not include another subset of the plurality of frames of the video content of the media presentation;
wherein the plurality of blended frames comprises a plurality of frame pairs, each frame pair comprising a respective first frame from the first subset of the plurality of frames of the video content and a respective second frame from the first subset of the plurality of frames of the video content, wherein the respective second frame is not adjacent to the respective first frame in the plurality of frames;
wherein, for each frame pair, a respective first content portion of the respective first frame and a respective second content portion of the respective second frame are blended together such that the plurality of blended frames forms a visually continuous image summarizing the media presentation;
determining, based on accessing data that groups subsets of the plurality of blended frames into a plurality of portions of the video tapestry, that an overlap portion of the video tapestry has been identified by an input received via an interface in which the video tapestry is displayed, wherein the overlap portion comprises at least two portions from the plurality of portions of the video tapestry each having at least one common frame; and
responsive to determining that an overlap portion of the video tapestry has been identified by the input received via the interface:
identifying a first tag cloud associated with a first portion in the overlap portion and a second tag cloud associated with a second portion in the overlap portion, and
rendering the first and second tag clouds for simultaneous display based at least in part on the first and second portions being in the overlap portion, wherein the first tag cloud is generated from a first text portion of a transcript of the video content that corresponds to the first portion in the overlap portion and the second tag cloud is generated from a second text portion of the transcript of the video content that corresponds to the second portion in the overlap portion.

18. The computing system set forth in claim 17,
wherein the plurality of portions of the video tapestry respectively correspond to different time intervals of the media presentation, and
wherein identifying each of the first and second tag clouds comprises determining that each of the first and second tag clouds is associated with a respective corresponding time interval of the media presentation.

19. The computing system set forth in claim 17, wherein the operation further comprise providing the interface comprising a play head and display area, wherein the video tapestry is displayed in the display area of the interface,
wherein the data referring to the overlap portion of the video tapestry corresponds to a position of the play head relative to the display area, wherein the input received via the interface causes the play head to be moved to the position.

20. The computing system set forth in claim 19, wherein the operations further comprise:
receiving data representing additional input changing the position of the play head to a different position relative to the display area; and
displaying a different tag cloud that includes tag clouds associated with portions in a different overlap portion of the video tapestry referenced by data corresponding to the different position of the play head.

21. The computing system set forth in claim 17, wherein the operation further comprise providing the interface, wherein the video tapestry is displayed in the interface and the data referring to the overlap portion is determined from a user gesture received via the interface.

22. The computing system set forth in claim 17, wherein displaying the first and second tag clouds comprises displaying a tag cloud generated from the identified first and second tag clouds, each of the identified first and second tag clouds is associated with a respective time interval of a plurality of overlapping time intervals of the media presentation, wherein the at least one common frame in the identified overlap portion of the video tapestry lies within the time intervals.

* * * * *